(No Model.)

S. B. SECRIST.
WHEELED PLOW.

No. 553,874.  Patented Feb. 4, 1896.

Witnesses:
N. M. Ward
E. Behel.

Inventor:
Samuel B. Secrist
By A. O. Behel
Attys.

UNITED STATES PATENT OFFICE.

SAMUEL B. SECRIST, OF BELOIT, WISCONSIN.

WHEELED PLOW.

SPECIFICATION forming part of Letters Patent No. 553,874, dated February 4, 1896.

Application filed May 13, 1895. Serial No. 549,124. (No model.)

*To all whom it may concern:*

Be it known that I, SAMUEL B. SECRIST, a citizen of the United States, residing at Beloit, in the county of Rock and State of Wisconsin, have invented certain new and useful Improvements in Wheeled Plows, of which the following is a specification.

The object of this invention is to form a connection between the main frame of a wheeled plow and the plow-beam for the purpose of raising and lowering the plow, whereby a substantially uniform power is required to lift the plow-beam.

Figure 1:
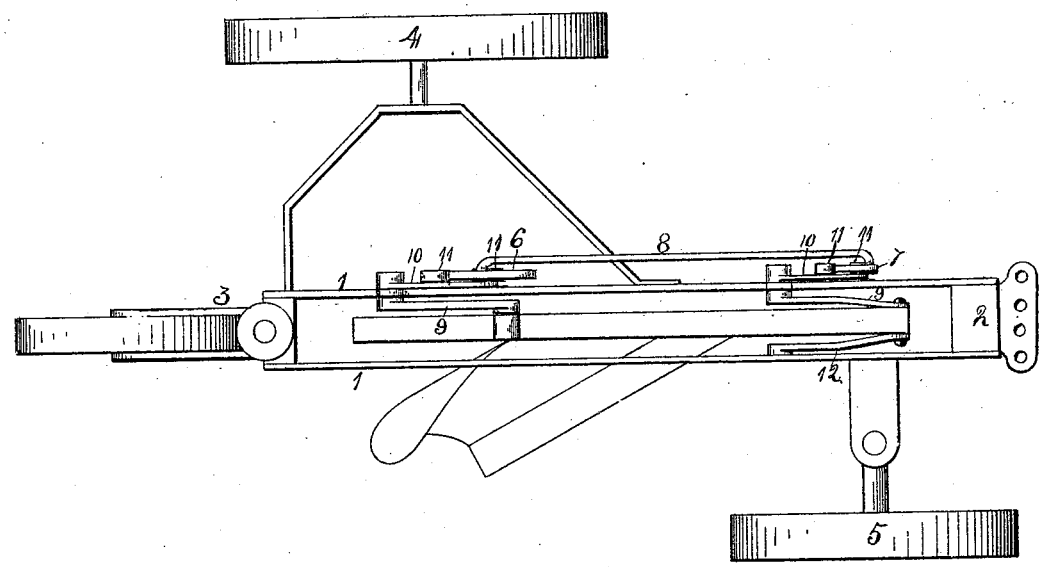
Figure 2:
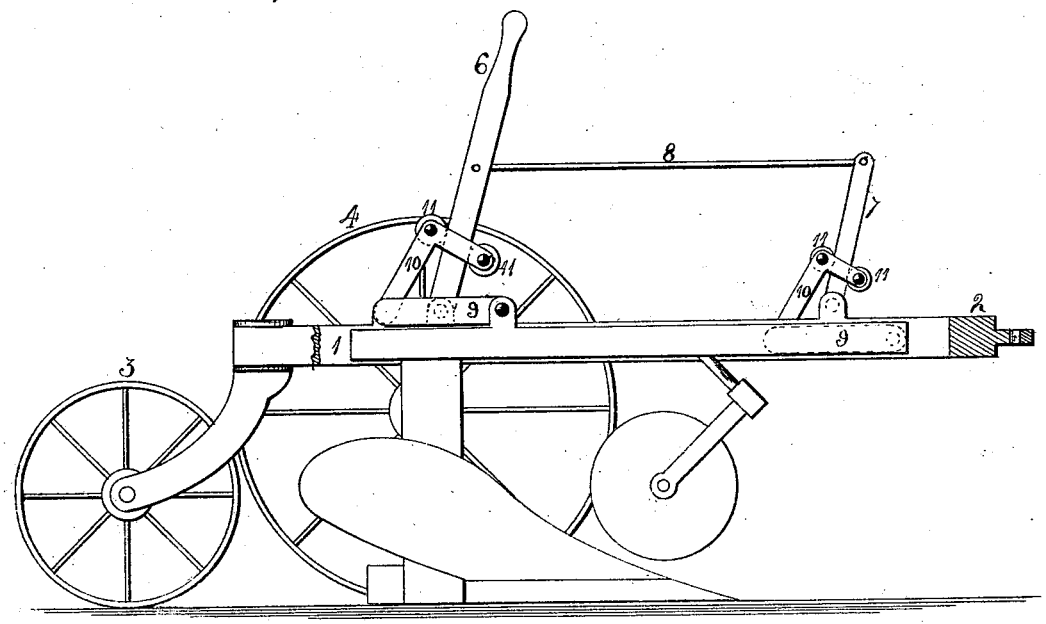

In the accompanying drawings, Figure 1 is a plan view of a wheeled plow embodying my improvements. Fig. 2 is a side elevation of the same, portions being cut away to more clearly show the operative parts.

This invention relates to that class of plows in which the plow-beam is supported by a main frame mounted upon carrying-wheels in which both ends of the plow-beam are raised and lowered uniformly.

The main frame is composed of lengthwise bars 1, held separated at their forward ends by a clevis 2 and their rear ends by a caster-wheel 3. A land-wheel 4 has a connection with the main frame, and a furrow-wheel 5 has a connection with the main frame near its forward end. To one of the side bars of the main frame are pivoted levers 6 and 7, the former being a hand-lever. These levers are connected by a link 8. Two bell-crank levers are pivotally supported by one of the lengthwise bars of the main frame, one arm, 9, of each having a pivotal connection with the plow-beam, the other arm, 10, of each supporting two rollers 11, which are located on each side of the levers 6 and 7. A link 12, corresponding to the arm 9 of the forward bell-crank, has one end pivoted to the main frame and its other end pivoted to the plow-beam.

When the plow-beam is in its depressed position the parts will appear as shown in the drawings, and when it is desired to elevate the plow the attendant moves the hand-lever 6 toward the rear of the machine. This movement will cause the arms 10 of the bell-crank to move rearward, which will cause the arms 9 of the bell-crank to be elevated, thereby elevating the plow-beam, carrying the plow and colter with it, and a movement of the hand-lever toward the front of the machine will lower the plow-beam.

By having a movable or sliding connection between the bell-crank and the levers the point of connection is constantly changing, the point of connection being nearest the pivotal connection of the levers with the main frame when the plow-beam is down. Consequently a greater leverage is had at the point when the greatest weight is to be lifted, and as the weight decreases the leverage is decreased. Consequently the same power is required to raise the plow-beam through its entire movement.

I claim as my invention—

1. In a wheeled plow, the combination of a main frame, a plow-beam, two levers having a pivotal connection with the main frame, one of which being a hand-lever, a link connecting the levers, bell-cranks pivotally supported by the main frame, one arm of each having a pivotal connection with the plow-beam, the other arm of each of the bell-cranks having a movable connection with the levers.

2. In a wheeled plow, the combination of a main frame, a plow-beam, two levers having a pivotal connection with the main frame, one of which being a hand-lever, a link connecting the levers, bell-cranks pivotally supported by the main frame, one arm of each having a pivotal connection with the plow-beam, the other arm of each of the bell-cranks supporting two rollers between which the levers are located.

SAMUEL B. SECRIST.

Witnesses:
 A. O. BEHEL,
 E. BEHEL.